Patented Aug. 12, 1947

2,425,389

UNITED STATES PATENT OFFICE 2,425,389

MANUFACTURE OF VINYL ESTERS

Horace Finningley Oxley and Edward Boaden Thomas, Spondon, near Derby, and Winton Gordon Boyce Mills, Wimbledon, London, England, assignors to British Celanese Limited, London, England, a company of Great Britain No Drawing. Application August 23, 1945, Serial No. 612,294. In Great Britain September 4, 1944

12 Claims. (Cl. 260—491)

This invention relates to the manufacture of vinyl esters, and in particular to the manufacture of vinyl esters of lower aliphatic acids, especially vinyl acetate, from the corresponding ethylidene diesters.

The manufacture of vinyl acetate by this method is made difficult by the fact that ethylidene diacetate may decompose in two main directions, which may be represented by the equations (1) $CH_3.CH(OAc)_2 \longrightarrow$
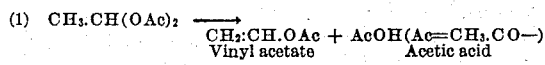
Vinyl acetate     Acetic acid (2) $CH_3.CH(OAc)_2 \longrightarrow CH_3.CHO + Ac_2O$
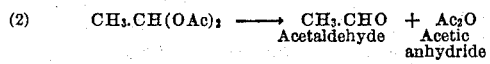
Acetaldehyde   Acetic anhydride Unfortunately there is a much greater tendency for Reaction 2 to occur than Reaction 1. To some extent this can be reduced by having present initially a considerable amount of acetic anhydride, but even when a tenfold molecular excess of acetic anhydride over the ethylidene diacetate is initially present, there is still a marked tendency to the production of acetaldehyde at the expense of vinyl acetate. In the laboratory this may not be particularly important, as the acetaldehyde can be reconverted into ethylidene diacetate and this in turn again thermally decomposed. On the industrial scale however it is essential to convert as high a proportion of the ethylidene diacetate as possible directly into vinyl acetate, and it has been our aim to discover what reaction conditions will lead to this result.

In pursuance of this aim we have investigated the effect of employing a wide variety of substances as catalysts. As our investigations proceeded we found that, while some of the substances tried were quite useful in the laboratory preparation of fairly small amounts of vinyl acetate, they were all unsuitable for industrial use in at least one of three respects. Either they were ineffective in promoting the desired reaction, and gave rise mainly to products other than vinyl acetate, especially acetaldehyde; or they caused a considerable degree of carbonisation; or their activity, while at first more or less satisfactory, rapidly fell off, and in such cases the addition of further quantities of the catalyst usually increased the amount of carbonisation which occurred.

For example sulphuric acid might have been expected to be a useful catalyst, but we found that it not only gave low yields of vinyl acetate, but also caused a great deal of carbonisation. Sodium bisulphate was at first fairly satisfactory, but soon began to cause excessive carbonisation. Sulphur dioxide proved to be ineffective, giving very poor yields indeed of vinyl acetate.

Oxy-acids of phosphorus were also tried. Ortho- and meta-phosphoric acids were fairly active for a short time, but they caused carbonisation and their activity soon fell off, and although the reaction could be kept going for considerable periods by adding fresh catalyst the conversion of ethylidene diacetate to vinyl acetate was, on the average, only about 30%; moreover, it was advisable every one to three hours to remove the reaction liquid and free it from the carbonaceous sludge which had formed. Furthermore the phosphoric acids tended to promote the formation of excessive quantities of acetaldehyde. Sodium salts of phosphoric acids were ineffective.

Alkyl esters of ortho-phosphoric acids, such as mono- and di-methyl and mono- and di-ethyl phosphates and mono-dodecyl phosphate, were at first more active than the acids themselves, but they reacted with the acetic anhydride giving the alkyl acetate and free phosphoric acid, which soon caused carbonisation and the production of acetaldehyde at the expense of vinyl acetate. In an effort to overcome this difficulty, phenyl-, methyl-, and oxyethyl-phosphonic acids were tried, but they proved not to be sufficiently active.

Other substances, including acetyl-phosphorous acid (made by the action of acetic anhydride and acetic acid on phosphorus trichloride), mono- and tri-chloracetic acids, boric acid, aluminum chloride, and arsenic acid, were also tried, but none of them proved satisfactory.

We have now found that when aromatic sulphonic acids are used as catalysts, the yield of vinyl acetate obtained is high, and the conversion of ethylidene diacetate to vinyl acetate is also high, the proportion of ethylidene diacetate remaining unchanged being considerably lower than with any of the other substances tried as catalysts. In addition to these advantages the aromatic sulphonic acid catalysts cause but little charring or carbonisation, and maintain their activity for long periods.

According to the present invention therefore a vinyl ester or substituted vinyl ester of a carboxylic acid is made by heating the ethylidene diester or the appropriately substituted ethylidene diester of the carboxylic acid in admixture with more than the equivalent quantity of the anhydride of the carboxylic acid and with an aromatic sulphonic acid, the vinyl ester or substituted vinyl ester produced being removed by distillation from the reaction zone as the reaction proceeds.

The invention is of particular value for the conversion of ethylidene diesters of lower fatty acids (i. e., fatty acids containing not more than five carbon atoms) and substituted lower fatty acids into the corresponding vinyl esters, and especially for the conversion of ethylidene diacetate into vinyl acetate.

As the aromatic sulphonic acid, benzene sulphonic acid has been found to give very good results, and it has the further advantage of being the simplest compound of this type. However, other aromatic sulphonic acids, for example toluene sulphonic acids, ethylbenzene sulphonic acids, xylene sulphonic acids, and naphthalene sulphonic acids, may be used if desired.

It is advisable to heat the ethylidene diester in admixture with at least three times and preferably more, for example 5 to 15 times, the equivalent amount of the corresponding acid anhydride.

The amount of catalyst employed may be between 10% and 70%, preferably between 15% and 40%, of the weight of the ethylidene diester. For example, benzene sulphonic acid or toluene sulphonic acids may with advantage be present in amount between 15 and 25% of the weight of the ethylidene diester, while sulphonic acids of considerably higher molecular weight, e. g. naphthalene sulphonic acids, may be employed in somewhat larger proportions.

The vinyl ester and the free acid simultaneously produced should be removed from the reaction zone by distillation as soon as possible after their formation, not only to force the reaction in the desired direction in accordance with the Mass Action Law, but also to reduce the risk of the vinyl ester polymerizing or undergoing other undesired reaction. It is also advantageous to have present in the reaction zone a compound capable of stabilizing vinyl compounds against polymerisation, for example copper or sodium acetate. The receiver in which the vinyl ester is collected may also contain a stabiliser, for example copper or sodium acetate or an organic anti-oxidant such as hydroquinone.

The reaction may be carried out in a still or other reaction vessel fitted with a fractionating column and with the necessary connections for feeding liquids into and withdrawing liquids from the still, the still and column preferably being made of or lined with stainless steel. The top of the column leads to a well-cooled condenser and receiver.

Although the production of vinyl esters according to the invention can be carried out as a simple batch process, it is one of the advantages of the aromatic sulphonic acid catalysts that they can be used for working continuously for periods very much longer than any of the other catalysts tried, without losing their activity or causing the accumulation of objectionable quantities of carbonaceous sludge.

In one method employing continuous working in the manufacture of vinyl acetate, an initial charge of acetic anhydride with about 1–3% of its weight of benzene sulphonic acid or of a toluene sulphonic acid, or somewhat more of a naphthalene sulphonic acid, and a little copper or sodium acetate, is introduced into the still and heated to boiling; ethylidene diacetate is then added continuously or at intervals at a rate such that the proportions of the ethylidene diacetate and the acetic anhydride and aromatic sulphonic acid are kept within the ranges hereinbefore set out. The vinyl acetate and acetic acid produced escape in the vapour phase from the column, and are condensed and collected in the receiver, which contains a trace of an anti-oxidant e. g. hydroquinone. Since acetic anhydride vapour is generally carried over with the vinyl acetate and acetic acid, this should be compensated for by adding fresh anhydride to the contents of the still, for example in admixture with ethylidene diacetate.

When it is desired to make vinyl acetate by a batch process, ethylidene diacetate dissolved in about 5 to 15 times its weight of acetic anhydride and mixed with about 15 to 25% of its weight of benzene sulphonic acid and a little copper or sodium acetate may be introduced into the still and the mixture heated to boiling, the vinyl acetate and acetic acid vapours being allowed to escape from the fractionating column and then condensed and collected in a receiver containing a trace of hydroquinone as in the continuous method of working. The reaction may be allowed to proceed to substantial completion, leaving in the still mainly acetic anhydride and benzene sulphonic acid, both of which may be employed in the treatment of a fresh batch of ethylidene diacetate. In place of the benzene sulphonic acid one of the other aromatic sulphonic acids may be used.

Whichever type of method is employed, the liquid collected in the receiver consists mainly of vinyl acetate, acetic acid and acetic anhydride, with smaller quantities of acetaldehyde and unchanged ethylidene diacetate. The vinyl acetate in the condensate may be isolated by fractional distillation, preferably always in the presence of hydroquinone or some other substance capable of inhibiting polymerisation of the vinyl acetate.

The ethylidene diesters or substituted ethylidene diesters employed as the starting materials in the process of the invention may be made, for example, by the action of the appropriate acid anhydride on acetaldehyde or a substituted acetaldehyde. For example, ethylidene diacetate may be made by heating acetaldehyde with acetic anhydride in the presence of an acid catalyst. This reaction can be made to yield vinyl acetate at the same time as ethylidene diacetate, but we have found that by first forming ethylidene diacetate in as high a yield on the acetaldehyde as possible, and then thermally decomposing the ethylidene diacetate by the process of the present invention, a substantially higher yield of vinyl acetate calculated on the acetaldehyde can be obtained than has been possible when forming vinyl acetate from acetaldehyde in a single stage.

The ethylidene diesters may also be made by other methods. For example ethylidene diacetate may be made by the reaction of acetylene and acetic acid in the presence of a mercuric salt e. g. mercuric sulphate.

The following examples illustrate the invention without limiting it in any way.

Example 1

350 lbs. of acetic anhydride and 7 lbs. of benzene sulphonic acid, with a little copper acetate, were introduced into a stainless steel still fitted with a fractionating column also of stainless steel, and heated to boiling. Ethylidene diacetate and further acetic anhydride were fed into the still at regular intervals, a total of 408 lbs. of ethylidene diacetate and 530 lbs. of acetic anhydride being added in 24 hours. A reflux ratio of 6:1 was maintained in the fractionating column during the whole of the operation. The vapours leaving the column were condensed and collected in a receiver containing a trace of hydroquinone. At the end of 24 hours the condensate contained 120 lbs. of vinyl acetate and 24 lbs. of acetaldehyde, together with acetic acid, acetic anhydride and some unchanged ethylidene diacetate. This corresponds to a conversion of ethylidene diacetate to vinyl acetate of about 51% and a conversion to acetaldehyde (which, of course, can be reconverted into ethylidene diacetate if desired) of about 19%, the remaining 30% of the ethylidene diacetate being recovered substantially unchanged, partly from the condensate and partly from the still. Substantially pure vinyl acetate was obtained by fractional distillation of the condensate.

Although for convenience the figures are given in this example in relation to a reaction time of 24 hours, the process can be continued for a much longer period if desired. As has already been pointed out, one of the advantages of the aromatic sulphonic acid catalysts is that, by virtue of their long life and slight tendency to cause carbonisation, they can be used for comparatively long periods. Moreover, when the activity of the catalyst does begin to fall off, more catalyst can be added without interrupting the process and without causing substantial carbonisation.

*Example 2*

This example illustrates the production of smaller quantities of vinyl acetate by a batch process.

438 gms. of ethylidene diacetate, 3,500 gms. of acetic anhydride, 79 gms. of benzene sulphonic acid and a little copper acetate were heated in a glass flask fitted with a fractionating column without any applied reflux until the temperature at the top of the column reached 136° C. The reaction was then complete. The vapours leaving the fractionating column were condensed and collected in a receiver containing a trace of hydroquinone. The condensate contained 153 gms. of vinyl acetate and 23 gms. of acetaldehyde corresponding to conversions of 59.3% and 17.4% respectively. The same quantities of ethylidene diacetate and acetic anhydride, but without any further benzene sulphonic acid, were then added and the operation repeated. The condensate contained 183 gms. of vinyl acetate and 25 gms. of acetaldehyde, corresponding to conversions of 71% and 19% respectively. The operation was again repeated, adding only ethylidene diacetate and acetic anhydride, with similar results.

Among vinyl esters other than vinyl acetate that may be made in accordance with the invention from the corresponding ethylidene diesters and acid anhydrides may be mentioned vinyl propionate, vinyl chloracetate and vinyl chlorpropionate. Substituted vinyl esters may be made from alkyl or other substituted ethylidene diesters e. g. methylvinyl acetate from propylidene diacetate and dimethylvinyl acetate from isobutylidene diacetate.

Having described our invention, what we desire to secure by Letters Patent is:

1. Process for the manufacture of a vinyl type ester of formula RR'C:CH.OAc, where R and R' are selected from the class consisting of hydrogen and alkyl groups and Ac is an acyl group derived from a fatty acid containing at most 5 carbon atoms, which comprises forming the vinyl type ester by heating a diester of formula RR'CH.CH(OAc)$_2$ where R, R' and Ac have the meanings set out above, in admixture with more than the equimolecular quantity of the anhydride of the carboxylic acid AcOH and with an aromatic hydrocarbon sulphonic acid as catalyst, and simultaneously removing the vinyl type ester by distillation from the reaction zone.

2. Process for the manufacture of a vinyl ester of a fatty acid containing at most 5 carbon atoms, which comprises forming the vinyl ester by heating the ethylidene diester of the fatty acid with at least three times the equimolecular quantity of the anhydride of the fatty acid and with an aromatic hydrocarbon sulphonic acid as catalyst, and simultaneously removing the vinyl ester by distillation from the reaction zone.

3. Process for the manufacture of vinyl acetate, which comprises forming vinyl acetate by heating ethylidene diacetate in admixture with at least three times the equimolecular quantity of acetic anhydride and with an aromatic hydrocarbon sulphonic acid as catalyst, and simultaneously removing the vinyl acetate by distillation from the reaction zone.

4. Process for the manufacture of a vinyl type ester of formula RR'C:CH.OAc, where R and R' are selected from the class consisting of hydrogen and alkyl groups and Ac is an acyl group derived from a fatty acid containing at most 5 carbon atoms, which comprises forming the vinyl type ester by heating a diester of formula RR'CH.CH(OAc)$_2$ where R, R' and Ac have the meanings set out above, in admixture with more than the equimolecular quantity of the anhydride of the carboxylic acid AcOH and with benzene sulphonic acid as catalyst, and simultaneously removing the vinyl type ester by distillation from the reaction zone.

5. Process for the manufacture of a vinyl ester of a fatty acid containing at most 5 carbon atoms, which comprises forming the vinyl ester by heating the ethylidene diester of the fatty acid with at least three times the equimolecular quantity of the anhydride of the fatty acid and with benzene sulphonic acid as catalyst, and simultaneously removing the vinyl ester by distillation from the reaction zone.

6. Process for the manufacture of a vinyl ester of a fatty acid containing at most 5 carbon atoms, which comprises forming the vinyl ester by heating the ethylidene diester of the fatty acid with at least three times the equimolecular quantity of the anhydride of the fatty acid and with an alkyl-substituted benzene sulphonic acid as catalyst, and simultaneously removing the vinyl ester by distillation from the reaction zone.

7. Process for the manufacture of a vinyl ester of a fatty acid containing at most 5 carbon atoms, which comprises forming the vinyl ester by heating the ethylidene diester of the fatty acid with at least three times the equimolecular quantity of the anhydride of the fatty acid and with naphthalene sulphonic acid as catalyst, and simultaneously removing the vinyl ester by distillation from the reaction zone.

8. Process for the manufacture of a vinyl ester of a fatty acid containing at most 5 carbon atoms, which comprises forming the vinyl ester by heating the ethylidene diester of the fatty acid with at least three times the equimolecular quantity of the anhydride of the fatty acid and with an aromatic hydrocarbon sulphonic acid as catalyst in amount 15–40% of the weight of the ethylidene diester, and simultaneously removing the vinyl ester by distillation from the reaction zone.

9. Process for the manufacture of vinyl acetate, which comprises forming vinyl acetate by heating ethylidene diacetate with at least three times the equimolecular amount of acetic anhydride and with 15–25% of its weight of benzene sulphonic acid, and simultaneously removing the vinyl acetate by distillation from the reaction zone.

10. Process for the manufacture of a vinyl ester of a fatty acid containing at most 5 carbon atoms, which comprises forming the vinyl ester by heating the ethylidene diester of the fatty acid with at least three times the equimolecular quantity of the anhydride of the fatty acid and with an aromatic hydrocarbon sulphonic acid as catalyst and of a small amount of a substance capable of inhibiting polymerization of vinyl esters, and simultaneously removing the vinyl ester by distillation from the reaction zone.

11. Process for the manufacture of vinyl acetate, which comprises forming vinyl acetate by heating ethylidene diacetate in admixture with at least three times the equimolecular quantity of acetic anhydride and with an aromatic hydrocarbon sulphonic acid as catalyst and of a small amount of a substance capable of inhibiting polymerization of vinyl esters, and simultaneously removing the vinyl acetate by distillation from the reaction zone.

12. Process for the manufacture of vinyl acetate, which comprises forming vinyl acetate by heating ethylidene diacetate with at least three times the equimolecular amount of acetic anhydride and with 15–25% of its weight of benzene sulphonic acid and a small amount of a substance capable of inhibiting polymerization of the vinyl acetate, and simultaneously removing the vinyl acetate by distillation from the reaction zone.

HORACE FINNINGLEY OXLEY.
EDWARD BOADEN THOMAS.
WINTON GORDON BOYCE MILLS.

REFERENCES CITED

The following references are of record in the file of this patent:

UNITED STATES PATENTS

| Number | Name | Date |
|---|---|---|
| 1,849,616 | Dykstra | Mar. 15, 1932 |
| 1,638,713 | Skirrow et al. | Aug. 9, 1927 |